Jan. 28, 1941. C. BRAMMING 2,229,720
WINDSHIELD WIPER
Original Filed Oct. 28, 1935 2 Sheets-Sheet 2
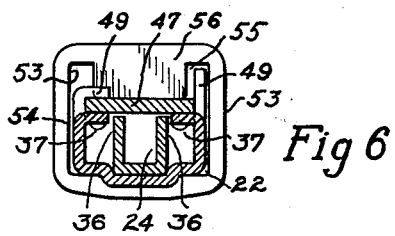
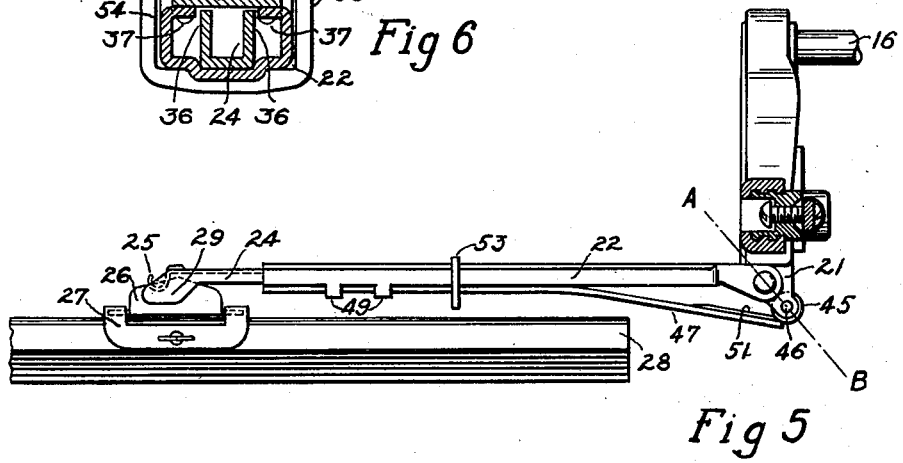
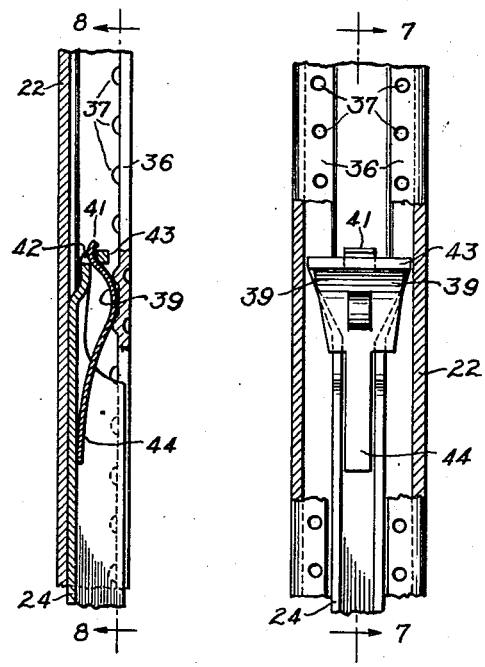
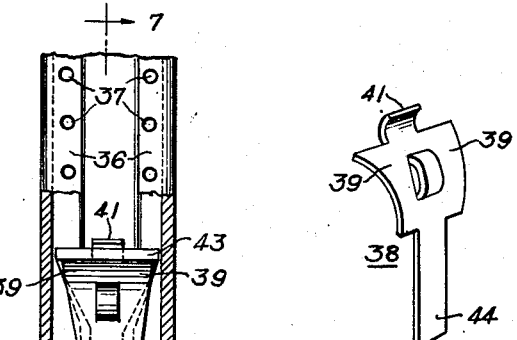
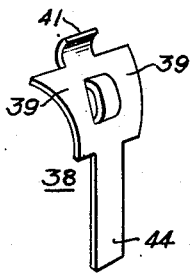
INVENTOR
Carl Bramming
BY Alois W. Graf
ATTORNEY Patented Jan. 28, 1941

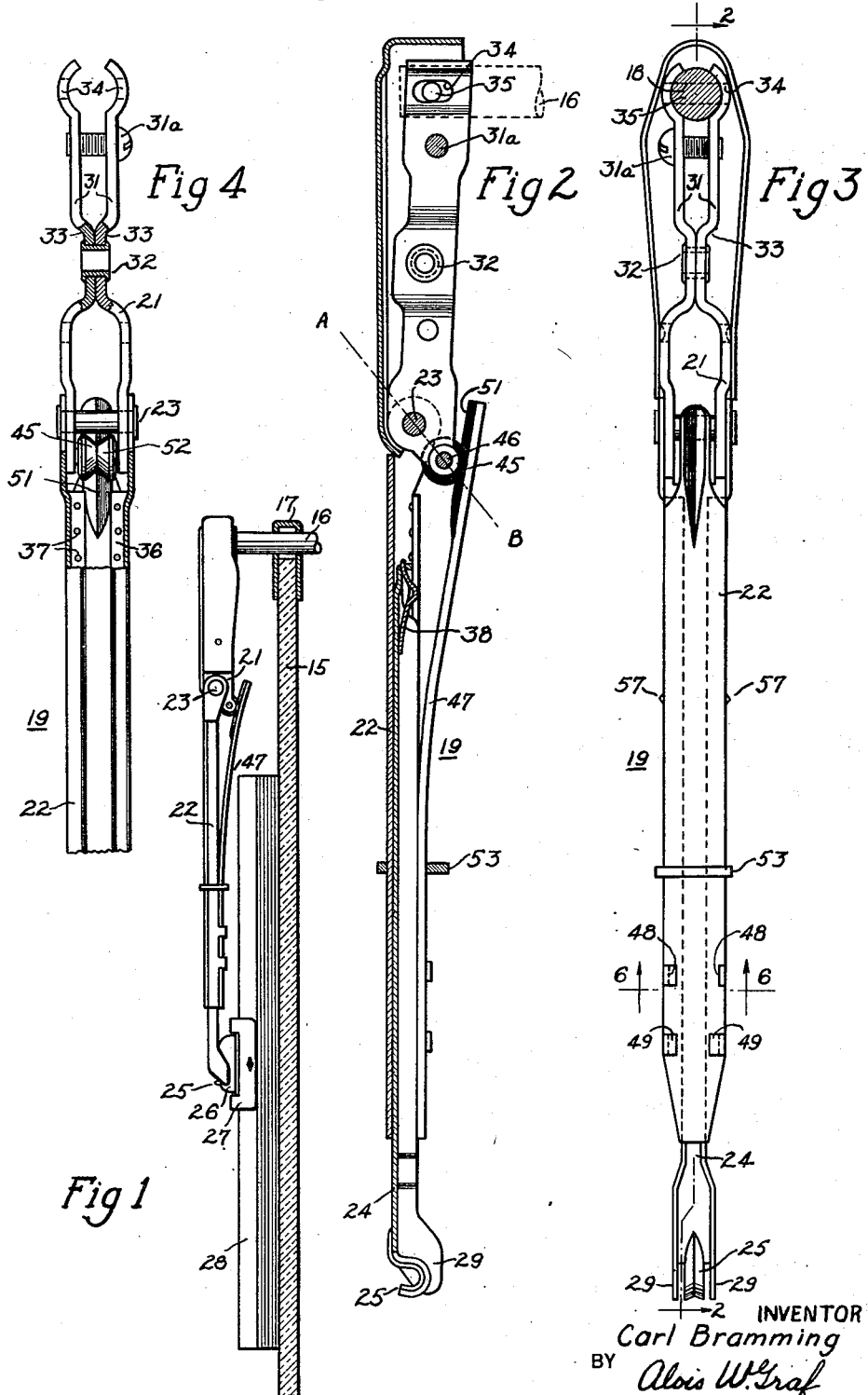

2,229,720

UNITED STATES PATENT OFFICE 2,229,720

WINDSHIELD WIPER

Carl Bramming, Anderson, Ind., assignor, by mesne assignments, to Productive Inventions, Inc., Gary, Ind., a corporation of Indiana Original application October 28, 1935, Serial No. 47,116. Divided and this application May 15, 1939, Serial No. 273,665

5 Claims. (Cl. 287—58)

This invention relates to windshield wiper, and particularly to the arm thereof by which the wiping element is supported and operatively connected to an actuating member, such as a shaft or other suitable device. This application is a division of my copending application for improvements in "Windshield wipers," Serial No. 47,116, filed October 28, 1935, and which is assigned to the same assignee as the present application.

One object of the present invention is to provide a sectional wiper arm which may be readily adjusted to various lengths for positioning the wiping element at various distances from the actuating member, and to provide simple and efficient means for yieldingly maintaining the respective sections of the arm in various positions of adjustment.

Another object of the invention is to provide a wiper arm strong enough to carry loads encountered in service without breakage of the arm adjacent the shaft or to the actuating member.

Another object of the invention is to provide a novel construction and arrangement whereby certain of the arm sections are yieldingly maintained in various positions of relative longitudinal adjustment with respect to each other.

Another object of the invention is to provide means for maintaining certain cooperating portions of the device in proper alignment for efficient operation.

A still further object of the invention is to improve devices of the character described in sundry details hereinafter referred to and particularly pointed out in the appended claims.

One embodiment of the present invention is shown for illustrative purposes in the accompanying drawings, in which:

Fig. 1 is a side view of my improved wiper arm illustrating its application to a wiping element and actuating member operatively related to a windshield;

Fig. 2 is an enlarged sectional elevation of the improved arm shown in Fig. 1, and taken substantially as indicated by the line 2—2 of Fig. 3;

Fig. 3 is a rear elevational view of the structure shown in Figs. 1 and 2, taken as viewed from the right side thereof;

Fig. 4 is a front view, partly in section, of the improved arm as viewed from the left side of Fig. 1, a cover member shown in Fig. 1 having been removed;

Fig. 5 is a side view of the improved wiper arm illustrating the manner of yieldingly maintaining a portion of the arm and wiping element in raised position away from the windshield to facilitate washing or manual cleaning thereof;

Fig. 6 is an enlarged transverse sectional view taken substantially as indicated by the line 6—6 of Fig. 3;

Fig. 7 is an enlarged longitudinal sectional elevational view of the structure for retaining portions of the device in relative longitudinal adjustment with respect to each other, and taken substantially as indicated by the lines 7—7 of Fig. 8;

Fig. 8 is a side elevational view, partly in section, of the structure illustrated in Fig. 7 as viewed from the right side thereof;

Fig. 9 is a perspective view of a portion of the structure illustrated in Figs. 7 and 8.

In the drawings, 15 designates a windshield having a wiper arm actuating member 16 shown, in the present instance, as a shaft, rotatably mounted in a frame 17 of the windshield, and provided, in the present instance, with a transversely extending aperture or recess 18 formed therein, preferably, adjacent the outer end thereof.

My improved wiper arm, indicated as a whole by the numeral 19, comprises an inner section 21, an intermediate section 22 pivotally connected to the inner section as by a pin 23, and an outer section 24, preferably, of channel formation in cross section and slidably mounted with respect to the intermediate section through a tapered guide portion 22a thereof, the outer section 24 having its extreme outer or lower end portion provided with a hook 25 adapted to engage a connector 26 upon which is mounted a clip 27 adapted to receive a windshield wiper element or blade 28 positioned and adapted for engagement with the surface of the windshield 15, the sides of the channel adjacent the hook 25 being extended and spaced from the hook, as indicated at 29, for receiving the sides of the connector 26 between the channel sides 29 and the hook 25.

The inner section 21 comprises, preferably, a pair of oppositely disposed side portions 31 connected together adjacent their central portion by a hollow rivet 32 and having outwardly faced recesses 33 formed therein at opposite sides thereof adjacent the rivet 32, the upper ends of the side portions 31 being spaced to receive the actuating member 16 and provided with apertures 34 adapted to receive a pin 35 extending through the aperture 18 of the actuating member 16 for securing the arm and actuating member together, a clamping screw 31a being employed for clamping the upper ends of the side portions 31 against the sides of the actuating member 16.

Pivotally mounted on the pin 23 in a manner to swing in a plane substantially perpendicular to the windshield is the intermediate arm section 22 comprising a transversely elongated U-shaped structure, best illustrated in Fig. 6, and having inwardly extending edge portions 36 provided on their inner faces with protuberances 37 adapted to be engaged by a resilient detent, indicated as a whole by the numeral 38 (Figs. 2 and 9), mounted on the inner end portion of the outer section 24, the said detent being formed of resilient material and provided with laterally extending curved wing portions 39 adapted to be positioned between the protuberances 37, and having a projection 41 positioned in an aperture 42 formed in the laterally bent portion 43 formed at the extreme inner end of the section 24, the detent 38 being provided also with a leg portion 44 adapted to be positioned between the legs of the channel forming the section 24 in a manner to retain the detent in proper alignment therewith for efficient engagement of the portions 39 with the protuberances 37 formed on the inner face of the inwardly extending edge portions 36 of the intermediate section 22.

It will be apparent from the foregoing description that the outer section 24 may be moved longitudinally in either direction within the U-shaped portion of the intermediate section 22 in a manner to adjustably vary the length of the arm 19 to position the wiper blade at various distances from the actuating member 16, the detent 38 being yieldable during such movement to permit the portions 39 to pass over the protuberances 37 and to be positioned between the protuberances, as clearly illustrated in Fig. 7, to yieldingly secure the outer section 24 in adjusted position with respect to the intermediate section 22.

For urging the intermediate section 22, outer section 24 and wiper blade 28 toward the windshield, a contact element, shown in the present instance as a roller, indicated as a whole by the numeral 45, is rotatably mounted on a shaft 46 carried by the inner section 21 at a point below and to the rear of the pin 23, as clearly shown in Figs. 1, 2 and 5, and mounted on the intermediate section 22 is a leaf spring 47 having recesses 48 formed in its opposite edge portions adjacent one end thereof adapted to receive, respectively, a plurality of lugs 49 formed on the intermediate section 22 and adapted to be bent inwardly as clearly shown in Figs. 3 and 6 for securing the spring 47 to the intermediate section 22, the opposite end of the spring 47 being extended upwardly into engagement with the contact element or roller 45 and provided adjacent its free end with a ridge 51 adapted to engage an annular groove 52 formed in the roller 45 for maintaining the spring in proper alignment and in engagement with the roller.

For varying the tension of the spring 47, a slide or yoke, indicated as a whole by the numeral 53, is provided with an opening 54 adapted to receive the intermediate section 22 and spring 47 in a manner to slide thereon, and with a plurality of recesses 55 communicating with said opening for receiving the lugs 49 in assembling the yoke 53 and intermediate arm section 22 when the lugs are in upstanding position and before being bent inwardly as shown in Figs. 3 and 6 for securing the spring 47 to the intermediate section 22, the yoke 53 being provided also with an intermediate portion 56 adapted to engage the spring 47, the innermost pair of the bent down lugs 49 serving to secure the yoke 53 against accidental displacement with respect to the arm.

It will be observed by such an arrangement that the tension of the spring 47 may be varied by moving the yoke 53 into various positions longitudinally thereof, the intermediate section 22 being provided with a pair of protuberances or projections 57 at opposite sides thereof for limiting the movement of the yoke.

By reference to Figs. 2 and 5, particularly Fig. 2, it will be apparent that when the free end of the spring 47 is in engagement with the contact element or roller 45, at one side of a line, indicated by the characters A—B extending through the pivotal center 23 of the arm and the axis of rotation 46 of the roller 45, that the tension of the spring 47 acts to yieldingly urge the intermediate section 22 and outer section 24 of the arm toward the windshield, and by reference to Fig. 5, it will be apparent that when the free end of the spring 47 is in engagement with the contact element or roller 45 on the opposite side of the line A—B, the tension of the spring 47 will act to urge the sections 22 and 24 in the opposite direction and to maintain the pivoted portions of the arm in adjusted position away from the windshield as illustrated in Fig. 5.

It is well known that in the operation of windshield wipers of the character described, the wiper blade, such as 28, changes its position and flops from one side to another at the extreme ends of its wiping movements or, in other words, when the direction of movement changes, thereby causing an outward movement of the free end of the arm section 24 away from the surface of the windshield. By positioning the contact element or roller 45 below the pivotal center 23 as shown in the present drawings, such movement will tend to increase the effective length of the spring 47, thereby reducing the effective pressure of the spring 47, thus it will be apparent that by placing the roller 45 lower than the pivot pin 23 on which the intermediate section 22 is hingedly connected to the inner section 21, the present arrangement provides not only a definite method of parking the arm away from the windshield, but the action is such that as the intermediate section 22 and outer section 24 of the arm assumes different angles with relation to the inner section 21, the effective length of the spring varies to compensate for changes in effective spring pressure, which would otherwise occur and thus undesirable variations in effective spring pressure are avoided.

Obviously, the present invention is not limited to the precise construction and arrangement shown and described as the same may be variously modified. Moreover, all the features of the invention need not be used conjointly as the same may be used to advantage in variously different combinations and subcombinations.

What I claim as new and desire to secure by Letters Patent is:

1. A windshield wiper arm comprising a plurality of sections including an outer section mounted on and longitudinally movable with respect to another of said sections, said other section comprising a channel shaped member, resilient leaf spring means mounted adjacent to the inner end of said outer section, and means provided on said other section for cooperating with said resilient means for maintaining the sections in various positions of longitudinal adjustment with respect to each other.

2. A windshield wiper arm comprising a plurality of sections including an outer section, one of said sections comprising a member of U-shaped cross section having inwardly extending edge portions, a detent adjacent one end of said outer section, a plurality of longitudinally spaced means formed on the edge portions of said one section cooperating with said detent for retaining the outer section in various positions of longitudinal adjustment with respect to said one of the sections.

3. A windshield wiper arm comprising a plurality of sections, one of said sections comprising a member of a generally U-shaped cross section having inwardly extending edge portions, said inwardly extending edge portions having a plurality of longitudinally spaced protuberances formed thereon, another of said sections being slidably mounted in said U-shaped portion of said first-mentioned section, the inner end of said other section having an end portion provided with an aperture, a resilient member having a portion mounted in the channel of said other section and having a projection positioned in said aperture, said resilient member having oppositely disposed portions engageable with said protuberances for yieldingly retaining the said sections in various positions of longitudinal adjustment with respect to each other.

4. In a windshield wiper arm having a plurality of sections, the combination of an intermediate section and an outer section, said intermediate section comprising a member of laterally elongated U-shaped cross section to form a channel having inwardly extending longitudinal edge portions, one end of said intermediate section being tapered inwardly to form a guide for said outer section, said inwardly extending longitudinal edge portion of said intermediate section having a plurality of longitudinally spaced inwardly extending protuberances formed thereon, said outer section having a portion intermediate its ends slidably mounted in said guide, one end of the outer section being extended laterally and slidably mounted in the U-shaped channel portion of the intermediate section, a spring actuated detent on said one end of the outer section engaging said intermediate section at points between said protuberances on the inwardly extending edge portions thereof for yieldingly retaining the outer section in various positions of longitudinal adjustment with respect to said intermediate section.

5. In a windshield wiper arm having three sections, the combination of an intermediate section and an outer section, said intermediate section comprising a member of laterally elongated U-shaped cross section having inwardly extending longitudinal edge portions, one end of said intermediate section being tapered inwardly to form a guide for said outer section, said inwardly extending longitudinal edge portions of said intermediate section having a plurality of longitudinally spaced protuberances formed thereon, said outer section having a portion intermediate its ends slidably mounted in said guide, one end of the outer section being extended laterally and slidably mounted in the U-shaped portion of the intermediate section, said outer section being provided with an aperture adjacent said laterally extended end, and a spring actuated detent provided with an interlocking portion for engaging said aperture of the outer section, said spring engaging said protuberances on the inwardly extending longitudinal edge portions of the intermediate section for yieldingly retaining the outer section in various positions of longitudinal adjustment with respect to said intermediate section.

CARL BRAMMING.